Figure 1:
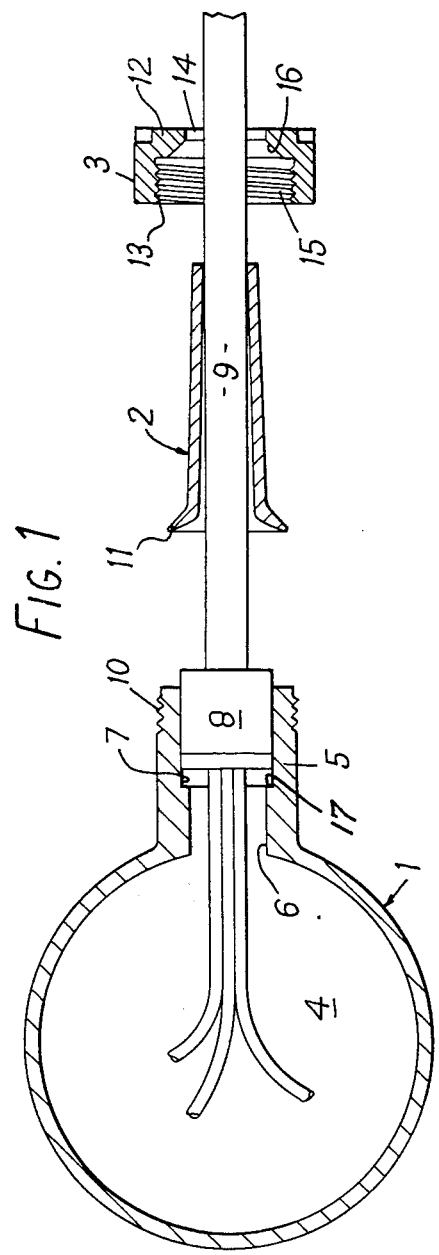

United States Patent [19]
Barrow et al.

[11] 3,941,917
[45] Mar. 2, 1976

[54] ELECTRICAL JUNCTION BOX ASSEMBLY

[75] Inventors: John Samuel Barrow, Mottram, via Hyde; Allen Radcliffe, Stockport; Donald Taylor, Staleybridge, all of England

[73] Assignee: Fosroc A.G., Switzerland

[22] Filed: June 20, 1974

[21] Appl. No.: 481,024

[30] Foreign Application Priority Data
June 29, 1973 United Kingdom............... 31191/73

[52] U.S. Cl. ............................................ 174/65 SS
[51] Int. Cl.² .......................................... H02G 3/08
[58] Field of Search............. 174/65 R, 65 SS, 77 R; 285/158, 128

[56] References Cited
UNITED STATES PATENTS

| | | | |
|---|---|---|---|
| 1,714,590 | 5/1929 | Dake | 174/65 SS |
| 3,040,120 | 6/1962 | Berry | 174/65 SS |
| 3,695,642 | 10/1972 | DeWoody | 174/84 R UX |
| 3,764,728 | 10/1973 | Howie et al. | 174/77 R X |

FOREIGN PATENTS OR APPLICATIONS

| | | | |
|---|---|---|---|
| 740,523 | 5/1943 | Germany | 174/77 |
| 114,612 | 3/1918 | United Kingdom | 174/77 |
| 867,210 | 5/1961 | United Kingdom | 174/77 |

*Primary Examiner*—J. V. Truhe
*Assistant Examiner*—D. A. Tone
*Attorney, Agent, or Firm*—Caesar, Rivise, Bernstein & Cohen

[57] ABSTRACT

An electrical conduit assembly comprises a box having at least one limb formed of synthetic resin and for receiving an end portion of a wire or a so-called "pot" connected thereto, and a compression ring, the limb having an integrally formed external male thread and the ring having an internal female thread whereby on locating the wire through the compression ring and screwing the ring onto the limb, the wire is held tight to the limb. A sheath having a flared annular rim at one end may be interposed between the wire and the ring.

3 Claims, 2 Drawing Figures

U.S. Patent   March 2, 1976   3,941,917

ELECTRICAL JUNCTION BOX ASSEMBLY

The invention relates to electrical installations in buildings. Generally such installations require electrical wiring which is housed within conduits (also known as "raceways") the inside diameter of which is about 25 mm. Joints and connections can be made within so-called junction boxes at which the conduits interconnect. The system is designed to meet building regulations which require a system to be erected completely before any wiring is drawn in so that the system is rewirable.

Typically, the conduits are made of steel but this has certain disadvantages. Screw threads must be cut on the ends of the conduit and a large number of parts is needed on site to make in interconnection between conduit and a junction box. Steel moreover is expensive and corrodible. In recent years conduit made of plastics, e.g. polyvinyl chloride or polyethylene has been introduced and this has certain advantages: corrosion resistance, lightness of weight and improved ease of working.

Both steel and plastics conduit suffer from the disadvantage of being of relatively wide diameter and new forms of electrical wiring having improved insulation have recently been introduced for specialized applications. Such wiring is known as mineral insulated cable or Armour cable. Because of their structure these forms of wiring do not require conduit of relatively wide diameter and so it would seem that the conduit could be dispensed with. However, this is not possible as space is needed to make electrical connections and such connections require some form of protection.

According to the invention, an electrical junction comprises a box and a compression ring, the box having at least one wire-receiving generally tubular limb formed of a synthetic resin, the limb being adapted to receive an end portion of a wire or an electrical component connected thereto, at least one end of the limb having a male screw thread and the compression ring having a female thread for engagement with the male thread of the limb and to hold the wire to the limb.

Preferably a sheath having a flared rim at one end is located about the end portion of the wire such that screwing of the ring onto the limb tends to compress the rim and the wire. Preferably, the sheath is formed of a flexible material. In another arrangement the sheath is an O-ring located between the limb and the compression ring such that screwing of the ring onto the limb tends to compress the sheath and the wire.

The limb preferably has a first relatively wider diameter portion for receiving an electrical component connected to the wire, e.g. a so-called "pot" and a second relatively narrower portion, a shoulder being formed at the union of these two portions.

Preferably the junction box and the compression ring together with the sheath (where present) are each moulded of synthetic resin. The box and the limb or limbs are moulded (although the limb may be a separate element secured to the box by screws, clamps or the like), and one advantage of moulding is that the male thread on the limb can be integrally moulded whereas, if the thread is subsequently cut in this tends to weaken the structure.

Figure 2:
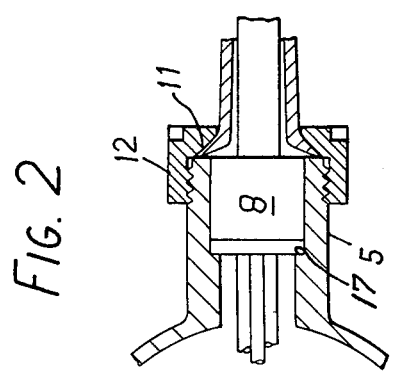

An embodiment of the invention is shown in the diagrammatic drawings which:

FIG. 1 is an exploded plan view, parts having been cut away, of a junction assembly for mineral insulated copper or aluminum covered cable; and FIG. 2 shows a detail of a formed junction assembly.

The assembly comprises a box 1, a sheath 2 and a compression ring 3. The box 1 has a cavity 4 of circular cross-sectional shape and, as shown, has one limb 5 although any number may be present. The limb has a through passageway 6 which, at its inner end, communicates with the box cavity. The outer end portion 7 of the passageway 6 is of relatively enlarged diameter and meets passageway 6 at a shoulder 17. The portion 7 is arranged to receive an electrical component such as a so-called "pot" 8 connected to a length of mineral insulated cable 9. The free end portion of the limb 5 has an external male screw thread 10. The box 1 is moulded in one piece of a rigid synthetic resin.

The sheath 2 comprises a length of flexible polyvinyl chloride tube which tapers outwardly towards a rim 11 which is flared outwardly to a diameter substantially that of the limb 5.

The compression ring 3 is moulded of rigid synthetic resin and comprises a base 12 having an upstanding rim 13. The base 12 has a hole 14 which is of a diameter larger than that of the cable 9. The rim 13 has an internal female screw thread 15 dimensioned to engage the screw-threading on the limb 5. The inner walls 16 at the union of the base 12 and the rim 13 taper towards the hole 14.

The ring 3 and the sheath 2 are first fed onto the cable 9 having the pot 8. The end of the cable is fed through the passageway 6 of the limb 5 until the pot 8 is received in the larger diameter portion 7 of the passageway. The sheath 2 is then pulled towards the limb 5 until the flared portion 11 is abutted against the free end of the limb. The compression ring 3 is then screwed onto the limb 5 and the end portion 11 of the sheath is compressed to form a fluid-tight joint, as shown in FIG. 2. In this way, a satisfactory joint is formed on site without the cutting of threads and using just three interconnecting pieces.

The box may have several limbs, some of which may receive plastics conduits and other the mineral insulated cable.

Without further elaboration, the foregoing will so fully illustrate our invention that others may, by applying current or future knowledge, readily adapt the same for use under various conditions of service.

What is claimed as the invention is:

1. In combination with a conduitless electrical wire of relatively small diameter and having a larger diameter electrical component connected to one end thereof, an electrical junction assembled secured to said wire, said assembly comprising a box, a sheath having a flared rim, and a compression ring, said box having at least one wire-receiving limb including a free end having a male thread thereon and formed of synthetic resin, said limb including a first relatively wider diameter opening of sufficient size to receive said electrical component therein and a second relatively narrower opening communicating with said first opening and through which said conduitless electrical wire extends, said first and second openings forming a shoulder at their union, said compression ring including a female thread, said sheath being disposed about said wire with the flared rim thereof abutting the free end of the limb, said compression ring being disposed about said sheath with the female thread thereof in threaded engagement with the male thread of said limb whereby said sheath is compressed into engagement with the wire to form a fluid-tight seal with said box and whereby said electrical component is closely held within the larger diameter opening in said limb between the shoulder and said flared rim.

2. An assembly according to claim 1 in which the junction box, the compression ring and the sheath are each moulded of synthetic resin.

3. An assembly according to claim 2 in which the junction box and the limb are integrally formed of synthetic resin.

* * * * *